Feb. 28, 1950 — W. H. PETTIGREW — 2,498,766
METHOD FOR CONTROLLING DUST IN SINTERING OPERATIONS
Filed Jan. 15, 1948
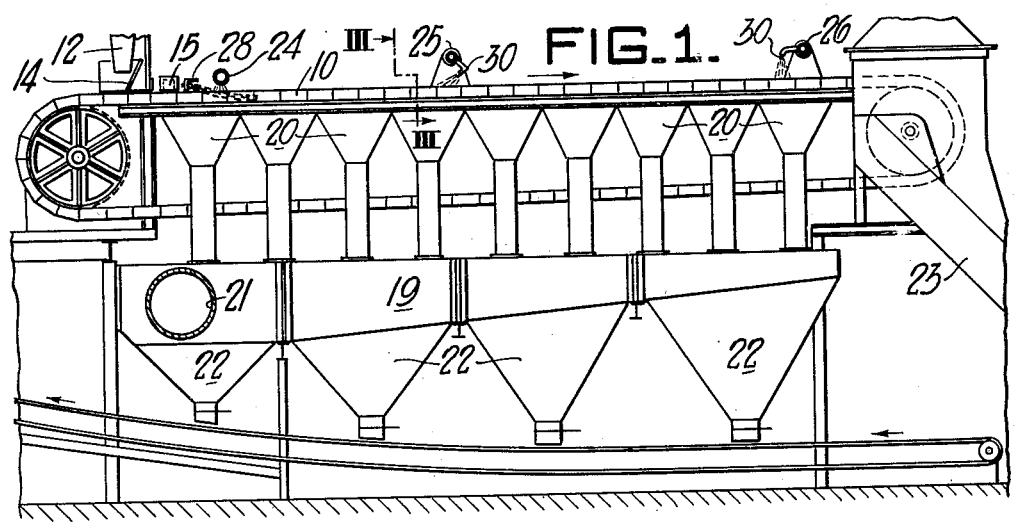
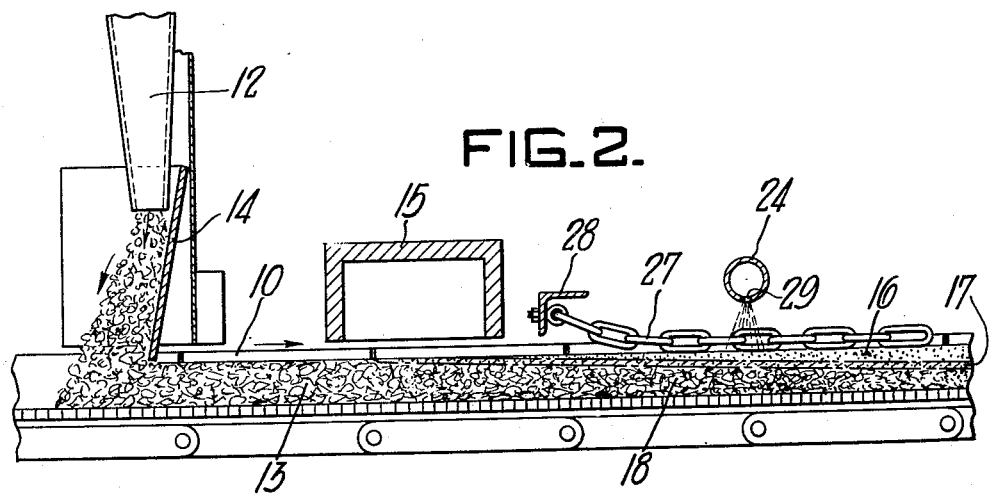
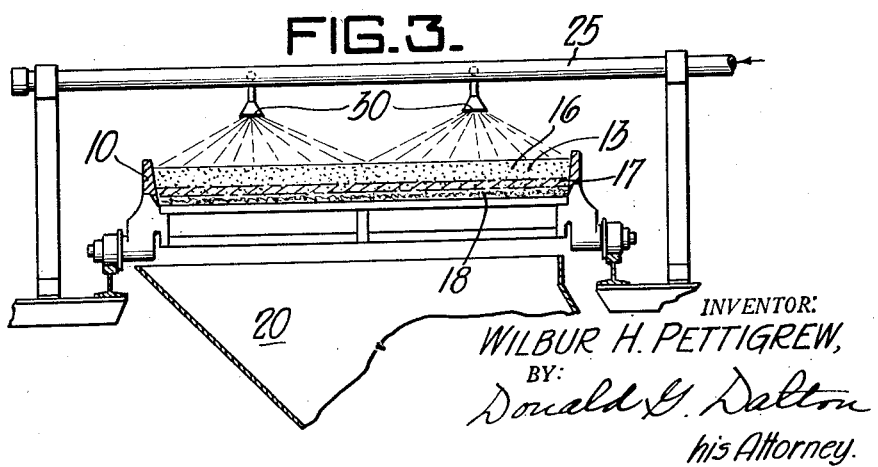
INVENTOR:
WILBUR H. PETTIGREW,
BY: Donald G. Dalton
his Attorney.

Patented Feb. 28, 1950

2,498,766

UNITED STATES PATENT OFFICE 2,498,766

METHOD FOR CONTROLLING DUST IN SINTERING OPERATIONS

Wilbur H. Pettigrew, Hobart, Ind., assignor to Carnegie-Illinois Steel Corporation, a corporation of New Jersey Application January 15, 1948, Serial No. 2,388

5 Claims. (Cl. 75—5)

1

This invention relates to methods for controlling moisture and free dust in sintering operations.

The methods of the present invention are particularly applicable to the sintering of pulverulent material recovered from blast furnace gases preparatory to recharging such material to a furnace. Obviously, however, the principles involved are not restricted to the sintering of any specific material.

Usual practice in cleaning blast furnace gases includes recovering both a dry dust product and a wet dust product. The latter is dewatered to form a filter cake and the dry product is mixed with this filter cake to form a sinter mixture. The recovered material is largely iron or iron oxide and contains some carbon in form of coke dust, the carbon content preferably being around 5 percent.

In typical sintering operations with which I am familiar, the sinter mixture is continuously spread uniformly on a moving conveyor to form a bed about eight inches deep. The carbonaceous material, which furnishes the fuel for sintering, is ignited at the upper surface of the bed near the feed end of the conveyor. A down draft of air is drawn through the bed and maintains a relatively thin combustion zone through the bed at progressively greater depths along the conveyor. At the discharge end the combustion zone should have progressed to the bottom of the bed so that the complete bed is sintered.

Sintering operations as just described usually set free much dust from the sinter mixture. Initially the sinter mixture contains enough moisture that it is not dusty. As combustion proceeds, the heat and the air draft dry the unsintered material beneath the combustion zone, whereupon the air draft picks up large quantities of free dust. Part of this dust is collected in hoppers beneath the conveyor and part escapes to the atmosphere. Such dust is objectionable for several reasons. It is harmful to the health and comfort of workmen; it pollutes the atmosphere; and its wastage is an economic loss. Time consumed in recovering dust from the hoppers decreases output of the sintering plant.

The loss of moisture in the bed also causes unevenness in combustion through the bed. Consequently the combustion zone does not always progress to the bottom of the bed at the discharge.

The principal object of the present invention is to provide methods for eliminating free dust in sintering operations.

A further object of the invention is to provide

2 methods for maintaining the moisture content of unsintered material in sintering beds within an optimum range through the length of the bed.

A further object of the invention is to provide methods for improving working conditions around sintering plants and increasing the output by controlling moisture and free dust.

In accomplishing these and other objects of the invention, I have provided improved details of structure, a preferred form of which is shown in the accompanying drawings, wherein:

Figure 1 is a side elevational view of a sintering apparatus having improved means for controlling moisture and free dust embodying features of the present invention;

Figure 2 is an enlarged vertical longitudinal sectional view of the feed portion of the apparatus; and Figure 3 is an enlarged cross sectional view taken substantially on line III—III of Figure 1.

Referring more in detail to the drawing:

In Figures 1 and 2, there is shown at 10 a standard sintering conveyor, the conveying surface of which moves to the right. Sinter mixture is fed to the left end of the conveyor through a spout 12 to form a bed 13. Said bed is leveled and smoothed by movement of the conveyor past a leveling plate 14, situated just beyond said spout. The combustible material at the upper surface of the bed is ignited in an ignition hood 15 beyond said plate.

As shown in Figure 2, the bed beyond said ignition box comprises three zones, an upper sintered zone 16, an intermediate combustion zone 17, and a lower unsintered zone 18. The combustion zone is progressively lower as the bed moves away from the feed.

To maintain combustion, air is drawn downwardly through the bed through a wind box 19 and a series of wind box hoppers 20, Figure 1. Wind box 19 is connected to a stack through a gas line 21 which conventionally contains dust collecting means, not shown. Beneath the wind box there are situated a plurality of dust collecting hoppers 22, which also collect particles drawn from the bed by the air draft. The sintered material is discharged from the far end of the conveyor through a chute 23 into a suitable bin.

The structure thus far described is typical of sintering plants and hence is not described in greater detail. In previous sintering practice there has been no control of the moisture content once the filter cake has been fed to the conveyor and combustion started. Consequently, material in the unsintered zone toward the discharge of the conveyor has become very dry and the air draft has picked up great quantities of free dust, as hereinbefore explained.

In accordance with the present invention, means are provided for controlling the moisture content of the unsintered zone throughout the entire bed. Such means comprises a transverse steam pipe 24 spaced above the bed adjacent ignition hood 15, and a plurality of water pipes 25 and 26 spaced above the bed farther down the conveyor. For best control of the moisture addition, pipes 24, 25 and 26 are preferably mounted for adjustment longitudinally of the bed. Preferably means are also provided for breaking the sintered crust evenly just beyond the ignition hood to enable the air draft and moisture to penetrate the bed uniformly to the unstintered zone. The last named means conveniently comprises a plurality of chains 27 which are attached to a cross bar 28 and drag across the newly formed crust.

Moisture is first introduced to the bed as steam via steam pipe 24, which has a plurality of small orifices 29 on its under side. The steam pipe is situated near the ignition point of the bed where the combustion zone is near the upper surface. Therefore, the moisture is introduced as steam in this region in order not to chill the burning material and extinguish combustion. Here the lower portion of the unsintered zone is relatively cool; hence the steam condenses to compensate for moisture drawn off by the air draft.

Farther along the bed where the combustion zone is deeper, more moisture is introduced to the bed as a water spray via pipes 25 and 26. The number of such pipes is not critical so long as the spray is proper to maintain the required moisture standards. Preferably each water pipe is constructed as shown in Figure 3, having one or more spray orifices 30 which furnish a fan-like spray that covers the whole width of the bed.

I have found that the optimum moisture content of the unsintered material is 14 to 17 percent by weight. A higher moisture content at the combustion zone retards combustion. A lower moisture content permits dust to form. I introduce moisture through the steam pipe and water pipes in such quantities that the moisture content of the unsintered zone does not fall below 14 percent and proximate to the combustion zone does not exceed 17 percent. The water addition may be judged by observing whether combustion is progressing satisfactorily and whether dust is being drawn off from the bed.

I find that maintaining the moisture content in the optimum range has the further advantage of furnishing more uniform combustion and a better sintered product, the moisture apparently having a catalytic effect. Thus I am able to complete combustion and sintering more accurately at the desired point, just ahead of the discharge. When combustion is incomplete at this point, discharging of the material creates an additional source of dust, which is eliminated by the present invention. Such material as collects in hoppers 22 is small in quantity and consists mostly of fragments that drop through the conveyor, rather than dust.

Thus by the present invention I have effectively eliminated the dust hazard around sintering plants. I have increased the output rate of the sintering apparatus and I have eliminated the need for frequent cleaning of the dust collecting hoppers.

While I have shown and described only certain embodiments of the invention, it is apparent that modifications may arise. Therefore, I do not wish to be limited by the disclosure set forth, but only by the scope of the appended claims.

I claim:

1. In the sintering of blast furnace flue dust, wherein a relatively thin combustion zone is maintained through the length of a moving sinter bed and combustion is supported by a down-draft of air through the bed, the improvement which comprises adding moisture to the bed at a plurality of locations spaced through the length thereof as combustion proceeds to maintain the moisture content of the unsintered material in the bed beneath the combustion zone at least 14 percent throughout and not greater than 17 percent proximate to the combustion zone.

2. In the sintering of blast furnace flue dust, wherein a relatively thin combustion zone is maintained through the length of a moving sinter bed at a progressively increasing depth and combustion is supported by a down-draft of air through the bed, the improvement which comprises adding moisture to the bed at a plurality of locations spaced through the length thereof as combustion proceeds to maintain the moisture content of the unsintered material in the bed beneath the combustion zone at least 14 percent throughout and not greater than 17 percent proximate to the combustion zone, the first moisture being added as steam and subsequent moisture being added as water sprays.

3. In the sintering of blast furnace flue dust, wherein a relatively thin combustion zone is maintained through the length of a moving sinter bed and combustion is supported by a down-draft of air through the bed, the improvement which comprises mechanically breaking the initial sintered crust near the feed end of the bed and then adding moisture to the bed through the mechanically broken crust at a plurality of locations spaced through the length of the bed as combustion proceeds to maintain the moisture content of the unsintered material in the bed beneath the combustion zone at least 14 percent throughout and not greater than 17 percent proximate to the combustion zone.

4. In the sintering of blast furnace flue dust wherein a relatively thin combustion zone is maintained through the length of a moving sinter bed at a progressively increasing depth and combustion is supported by a down-draft of air through the bed, the improvement which comprises mechanically breaking the initial sintered crust near the feed end of the bed and then adding moisture to the bed through the mechanically broken crust at a plurality of locations spaced through the length of the bed as combustion proceeds to maintain the moisture content of unsintered material in the bed at least 14 percent throughout and not greater than 17 percent proximate to the combustion zone, the first moisture being added as steam and subsequent moisture being added as water sprays.

5. A method of sintering blast furnace flue dust comprising feeding moist sinter mixture to form a sinter bed, conveying the bed longitudinally, igniting the bed at its upper surface adjacent the feed point, drawing a down-draft of air through said bed for maintaining combustion thereof, the combustion zone becoming progressively deeper in the direction in which the bed is conveyed, mechanically breaking the initial sintered crust near the feed end of the bed, adding moisture in the form of steam to the top of the bed through the mechanically broken crust at a location where the combustion zone is near the upper surface and the greater part of the bed thickness consists of unsintered material, the steam condensing as it passes through the unsintered material to moisten this material and adding moisture in the form of water sprays to the top of the bed through the mechanically broken crust at locations where the combustion zone is deeper and which are spaced from the location of the first moisture addition in the direction in which the bed is conveyed, the moisture additions maintaining the moisture content of the unsintered material in the bed at least 14 percent throughout and not greater than 17 percent proximate to the combustion zone.

WILBUR H. PETTIGREW.

REFERENCES CITED

The following references are of record in the file of this patent:

UNITED STATES PATENTS

| Number | Name | Date |
| --- | --- | --- |
| 1,083,252 | Hall | Dec. 30, 1913 |
| 1,183,891 | McMurray et al. | May 23, 1916 |
| 1,741,943 | Linney | Dec. 31, 1929 |
| 2,248,180 | Moriarty | July 8, 1941 |